US009803578B2

(12) United States Patent
Russe et al.

(10) Patent No.: US 9,803,578 B2
(45) Date of Patent: Oct. 31, 2017

(54) METHOD AND DEVICE FOR OPERATING AN INJECTION VALVE

(71) Applicant: Continental Automotive GmbH, Hannover (DE)

(72) Inventors: Peter Matthias Russe, Tegernheim (DE); Anselm Schwarte, Bad Abbach (DE)

(73) Assignee: CONTINENTAL AUTOMOTIVE GMBH, Hanover (DE)

( * ) Notice: Subject to any disclaimer, the term of this patent is extended or adjusted under 35 U.S.C. 154(b) by 352 days.

(21) Appl. No.: 14/417,879

(22) PCT Filed: Aug. 14, 2013

(86) PCT No.: PCT/EP2013/066964
§ 371 (c)(1),
(2) Date: Jan. 28, 2015

(87) PCT Pub. No.: WO2014/027013
PCT Pub. Date: Feb. 20, 2014

(65) Prior Publication Data
US 2015/0252746 A1  Sep. 10, 2015

(30) Foreign Application Priority Data
Aug. 16, 2012  (DE) .......... 10 2012 214 565

(51) Int. Cl.
*F02D 41/20* (2006.01)
*F02D 41/24* (2006.01)
*H02N 2/06* (2006.01)

(52) U.S. Cl.
CPC ..... *F02D 41/2096* (2013.01); *F02D 41/2467* (2013.01); *H02N 2/06* (2013.01)

(58) Field of Classification Search
CPC ...... H02N 2/067; H02N 2/06; F02D 41/2096; F02D 41/2467
(Continued)

(56) References Cited

U.S. PATENT DOCUMENTS 6,155,500 A * 12/2000 Takase ................ F02D 41/2096
239/533.3
6,253,736 B1 * 7/2001 Crofts ................... F02M 65/005
123/467

(Continued)

FOREIGN PATENT DOCUMENTS

DE         10025579 A1   12/2001   ............ F02D 41/20
DE    102004001358 A1    8/2005   ............ F02D 35/00

(Continued)

OTHER PUBLICATIONS

International Search Report and Written Opinion, Application No. PCT/EP2013/066964, 14 pages, dated Jan. 8, 2014.

*Primary Examiner* — Thomas Moulis
*Assistant Examiner* — John Bailey
(74) *Attorney, Agent, or Firm* — Slayden Grubert Beard PLLC

(57) ABSTRACT

An injection valve has a moveable nozzle needle that controls a dosing of fluid and a solid-state actuator that actuates the nozzle needle. To operate the injection valve, values of a characteristic for a load state of the actuator are detected at a predetermined sampling rate. A start reference time and end reference time are determined correlating in chronological terms to an operating phase in which the solid-state actuator is discharged to a predetermined reference state by absorbing the energy in a discharging resistor. A correction reference value is determined based on a detected value of the characteristic correlating to an end of the operating phase, and a predetermined reference value. A correction value pattern is determined based on the end (Continued)

reference time, the start reference time, and the correction reference value. The detected values of the characteristic for the load state are determined based on the correction value pattern.

16 Claims, 2 Drawing Sheets

(58) Field of Classification Search
USPC ........ 701/103, 101, 102, 104; 123/490, 494, 123/498; 310/323.17, 316.03; 73/114.45
See application file for complete search history.

(56) References Cited

U.S. PATENT DOCUMENTS

| | | | | |
|---|---|---|---|---|
| 6,575,138 B2* | 6/2003 | Welch | ............ | F02M 21/0254 123/467 |
| 6,912,998 B1* | 7/2005 | Rauznitz | ............ | F02D 41/2096 123/490 |
| 7,578,280 B2* | 8/2009 | Fujii | ............ | F02D 41/2096 123/299 |
| 7,626,315 B2* | 12/2009 | Nagase | ............ | F02D 41/2096 310/316.03 |
| 8,413,638 B2* | 4/2013 | Mumford | ............ | F02D 41/20 123/490 |
| 8,479,711 B2* | 7/2013 | Morris | ............ | F02M 51/0603 123/490 |
| 8,714,140 B2* | 5/2014 | Borchsenius | ............ | F02D 41/008 123/494 |
| 2001/0027780 A1* | 10/2001 | Rueger | ............ | F02D 41/2096 123/498 |
| 2001/0035697 A1* | 11/2001 | Rueger | ............ | H02N 2/067 310/316.03 |
| 2002/0008440 A1* | 1/2002 | Hedenetz | ............ | F02D 41/2096 310/316.03 |
| 2002/0017280 A1* | 2/2002 | Rueger | ............ | F02D 41/2096 123/498 |
| 2002/0023622 A1* | 2/2002 | Rueger | ............ | F02D 41/2096 123/490 |
| 2004/0080242 A1* | 4/2004 | Ohnishi | ............ | F02D 41/2096 310/314 |
| 2005/0252494 A1* | 11/2005 | Rauznitz | ............ | F02D 41/2096 123/498 |
| 2006/0255302 A1* | 11/2006 | Aspelmayr | ............ | F02D 41/20 251/129.06 |
| 2009/0051247 A1* | 2/2009 | Kakehi | ............ | H02N 2/067 310/316.03 |
| 2009/0063016 A1* | 3/2009 | Nakata | ............ | F02D 41/2096 701/103 |
| 2009/0090333 A1* | 4/2009 | Spadafora | ............ | F02D 41/2096 123/494 |
| 2009/0159052 A1* | 6/2009 | Steinbauer | ............ | H02N 2/067 123/494 |
| 2009/0260599 A1* | 10/2009 | Venkataraghavan et al. ............ F02M 47/027 123/498 | | |
| 2009/0314073 A1* | 12/2009 | Perryman | ............ | F02D 41/2096 73/114.45 |
| 2009/0326788 A1* | 12/2009 | Yuasa | ............ | F02D 41/3809 701/104 |
| 2010/0001618 A1* | 1/2010 | Fukagawa | ............ | F02D 41/2096 310/317 |
| 2010/0036588 A1* | 2/2010 | Marzahn | ............ | F02D 41/2096 701/104 |
| 2010/0147262 A1* | 6/2010 | Martin | ............ | F02D 19/0647 123/299 |
| 2010/0201291 A1* | 8/2010 | Cheiky | ............ | F02D 41/2096 318/116 |
| 2010/0211291 A1* | 8/2010 | Sumitani | ............ | F02D 41/0085 701/104 |
| 2010/0268440 A1* | 10/2010 | Reichinger | ............ | F02D 41/2096 701/103 |
| 2010/0288239 A1* | 11/2010 | Morris | ............ | F02M 51/0603 123/494 |
| 2013/0019842 A1* | 1/2013 | Shaver | ............ | F02C 9/26 123/478 |
| 2013/0166179 A1* | 6/2013 | Schwarte | ............ | F02D 41/20 701/104 |
| 2013/0226472 A1* | 8/2013 | Hoffmann | ............ | F02D 41/2096 702/38 |
| 2013/0233936 A1* | 9/2013 | Schwarte | ............ | F02D 41/2096 239/5 |
| 2013/0333455 A1* | 12/2013 | Hoffmann | ............ | F02D 41/2096 73/114.15 |

FOREIGN PATENT DOCUMENTS

| | | | |
|---|---|---|---|
| DE | 102004016893 A1 | 10/2005 | ............ F02D 41/20 |
| DE | 102008023373 A1 | 11/2009 | ............ F02D 41/20 |
| DE | 102010040283 B3 | 12/2011 | ............ F02D 41/20 |
| EP | 1138915 A1 | 10/2001 | ............ F02D 41/20 |
| WO | 2011/154124 A1 | 12/2011 | ............ F02D 41/20 |
| WO | 2014/027013 A1 | 2/2014 | ............ F02D 41/20 |

* cited by examiner

METHOD AND DEVICE FOR OPERATING AN INJECTION VALVE

CROSS-REFERENCE TO RELATED APPLICATIONS

This application is a U.S. National Stage Application of International Application No. PCT/EP2013/066964 filed Aug. 14, 2013, which designates the United States of America, and claims priority to DE Application No. 10 2012 214 565.6 filed Aug. 16, 2012, the contents of which are hereby incorporated by reference in their entirety.

TECHNICAL FIELD

The invention relates to a method and a device for operating an injection valve, which is used, in particular, to meter fluid, to be precise in particular fuel.

BACKGROUND

Ever stricter legal requirements with respect to the permitted emission of pollutants of internal combustion engines which are arranged in motor vehicles make it necessary to implement various measures which can reduce the emission of pollutants. A starting point in this context is to lower the emission of pollutants which are generated during the combustion process of the air/fuel mixture. In this context, extremely precise metering of fuel is advantageous.

In addition, in this context it is also advantageous if multiple injections take place during a working cycle at least in certain operating states.

SUMMARY

One embodiment provides a method for operating an injection valve having a nozzle needle which, in a closed position, stops metering of fluid and otherwise releases the metering of fluid, and having a solid-state actuator which is designed to act on the nozzle needle and to influence its position, wherein, for an injection process, values of a characteristic variable for a state of charge of the solid-state actuator are acquired with a predefined sampling rate, a starting reference time is determined, a final reference time is determined, to be precise chronologically correlated with an operating phase in which the solid-state actuator is discharged to a predefined reference state, by absorbing the energy in a discharge resistor, a correction reference value is determined as a function of a value of the characteristic variable for the state of charge of the solid-state actuator which is acquired correlated with an end of the operating phase, and a predefined reference value, a correction value profile is determined as a function of the final reference time, the starting reference time and the correction reference value, and the acquired values of the characteristic variable for the state of charge are corrected as a function of the correction value profile.

In a further embodiment, the correction value profile is linear.

Another embodiment provides a device for operating an injection valve having a nozzle needle which, in a closed position, stops metering of fluid and otherwise releases the metering of fluid, and having a solid-state actuator which is designed to act on the nozzle needle and to influence its position, wherein the device is designed, for an injection process: to acquire values of a characteristic variable for a state of charge of the solid-state actuator with a predefined sampling rate, to determine a starting reference time, to determine a final reference time, to be precise chronologically correlated with an operating phase in which the solid-state actuator is discharged to a predefined reference state by taking up the energy in a discharge resistor, to determine a correction reference value as a function of a value of the characteristic variable for the state of charge of the solid-state actuator which was determined correlated to an end of the operating phase, and a predefined reference value, to determine a correction value profile as a function of the final reference time, the starting reference time and the correction reference value, and to correct the acquired values of the characteristic variable for the state of charge as a function of the correction value profile.

BRIEF DESCRIPTION OF THE DRAWINGS

Example embodiments of the invention are explained in more detail below with reference the drawings, in which.

DETAILED DESCRIPTION

Figure 1:
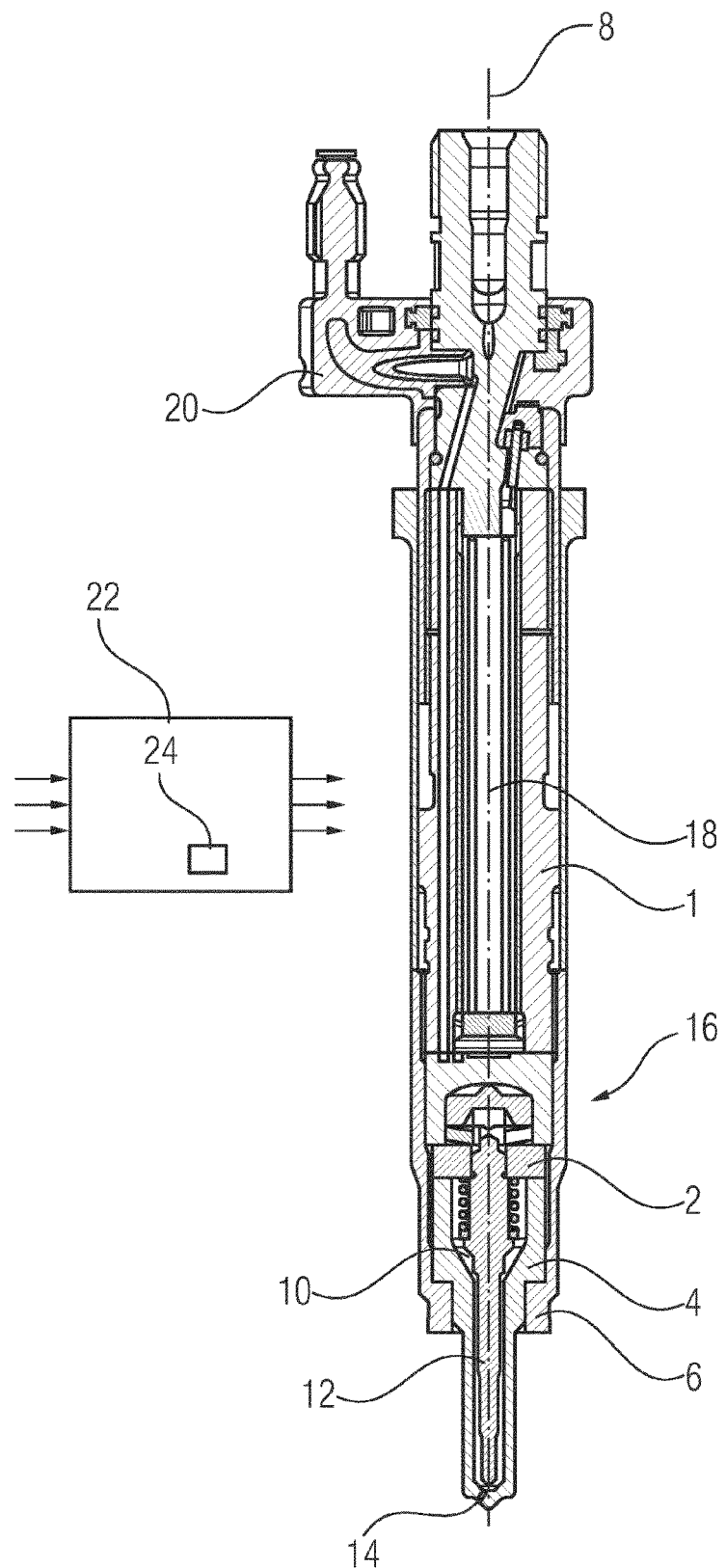
FIG. 1 shows an injection valve having a control device.
Figure 2:
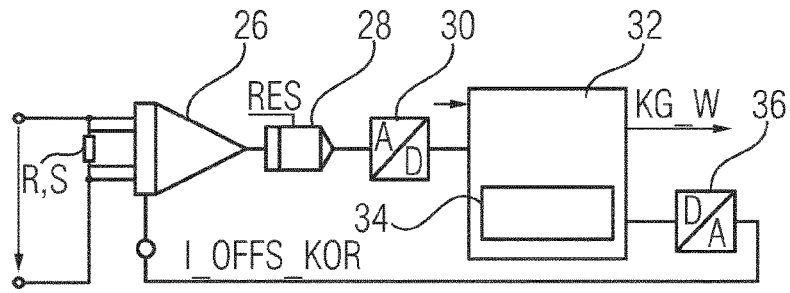
FIG. 2 shows a hardware integrator circuit arrangement which is embodied in the control device.

Embodiments of the invention provide a method and a device for operating an injection valve which permit precise metering of fluid by the injection valve.

More particularly, embodiments of the invention provide a method and a device for operating an injection valve having a nozzle needle which, in a closed position, stops metering of fluid and otherwise releases the metering of fluid. The injection valve also has a solid-state actuator which is designed to act on the nozzle needle and to influence its position. The following steps are carried out for an injection process.

Values of a characteristic variable for a state of charge of the solid-state actuator are acquired with a predefined sampling rate. A starting reference time is determined which is related to the injection process. In addition, a final reference time is determined, to be precise chronologically correlated with an operating phase in which the solid-state actuator is discharged to a predefined reference state, by absorbing the energy in a discharge resistor. A correction reference value is determined as a function of a value of the characteristic variable which has been acquired correlated with an end of the operating phase in which the solid-state actuator is discharged to the predefined reference state, and as a function of a predefined reference value. A correction value profile is determined as a function of the final reference time, the starting reference time and the correction reference value. The acquired values of the characteristic variable for the state of charge are corrected as a function of the correction value profile.

In this context, an injection process can be understood as being an individual fluid-metering process. However, an injection process also comprises linking a plurality of partial injections which are carried out by an injection valve during a working cycle of an internal combustion engine, to be precise when the operating phase in which the solid-state actuator is discharged to a predefined reference state by absorbing the energy in the discharge resistor is not assumed between respective partial injections.

By means of the procedure, in the case of injection processes, in particular in the case of relatively long injection processes, a drift error which occurs there can also be particularly easily and precisely compensated, to be precise, in particular, for the values of the characteristic variable which have been acquired during the respective injection processes. This therefore permits the values to be made available with a high quality level, that is to say a low measuring error. This has the effect that when the values are correspondingly processed further, for example in order to determine characteristic points which are representative of predefined events within the injection valve, particularly precise control of the metering of fluid by the injection valve is made possible.

According to one embodiment, the correction value profile is linear. In this way, the correction value profile can be determined particularly easily.

An injection valve has an injector housing 1 (FIG. 1) to which, in addition, an adaptor plate 2, a nozzle body 4 and a nozzle clamping nut 6 are assigned. The nozzle clamping nut 6 couples the adaptor plate 2 and the nozzle body 4 to the injector housing 1. Basically, the adaptor plate 2 and/or the nozzle body 4 can also be embodied in one piece with the injector housing 1.

The injector housing 1 also has a fluid inlet 8 which is hydraulically coupled to a fluid feed line, which comprises, for example, a fluid high-pressure accumulator.

A nozzle needle 12 is arranged in a recess 10 in the nozzle body 4. In addition, at least one injection hole 14 is formed in the nozzle body 4, said injection hole 14 leading outwards from the recess 10 out of the nozzle body 4.

Furthermore, the injection valve comprises a transmission arrangement 16 which comprises a lever and/or a return stroke and via which the nozzle needle 12 can be coupled mechanically to a solid-state actuator 18.

The solid-state actuator 18 is embodied, for example, as a piezo-electric actuator. However, it can also be embodied as any other solid-state actuator which is known to a person skilled in the art for such purposes, such as for example a magnetostrictive actuator.

In addition, an electrical terminal 20 is provided via which the injection valve can be coupled in an electrically conductive fashion to a control device 22.

The control device 22 is designed to generate, as a function of at least one operating variable, at least one actuating signal which is provided, for example, for actuating the injection valve. Operating variables comprise in this context any desired measuring variables or variables derived therefrom. The control device 22 can also be referred to as a device for operating the injection valve.

In a closed position of the nozzle needle 12, the latter stops metering of fluid through the at least one injection hole 14. Outside the closed position of the nozzle needle 12, that is to say when the nozzle needle is located in the axial direction along the longitudinal axis of the injection valve, in a position which is changed in an upward direction in the plane of the drawing with respect to its closed position, it releases the metering of fluid. In order to carry out metering of fluid, electrical energy is firstly fed to the solid-state actuator 18, to be precise by feeding in a predefined charge.

This results in the solid-state actuator 18 becoming longer in the axial direction and this lengthening being transmitted to the nozzle needle 12 via the transmission arrangement 16. In this way, a force is therefore applied to the nozzle needle 12, which force acts on the nozzle needle 12 in such a way that, without further forces acting on it, the nozzle needle 12 moves out of its closed position. In addition, in particular a spring force of a restoring spring acts on the nozzle needle 12, as do also hydraulic forces caused by the fluid pressure of the fluid in the recess 10. As a result, the nozzle needle 12 moves out of its closed position as a function of the force balance of the forces acting on it. However, in order to move the nozzle needle out, its inertial force must also be overcome so that this results in what is referred to as an electrohydraulic delay time period until the nozzle needle 12 actually moves out of its closed position.

The injection valve can be operated in various operating modes for a closing process of the nozzle needle 12 during which said nozzle needle 12 moves from a position outside the closed position back into its closed position.

Figure 3:
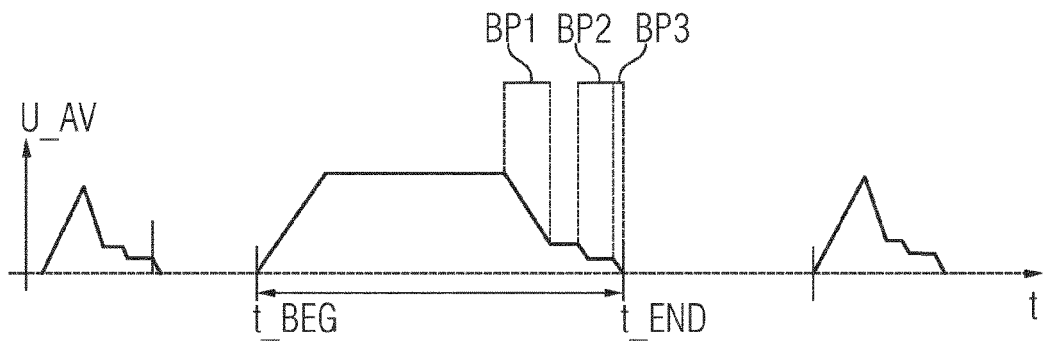
FIG. 3 shows signal profiles during the operation of the injection valve.
Figure 4:
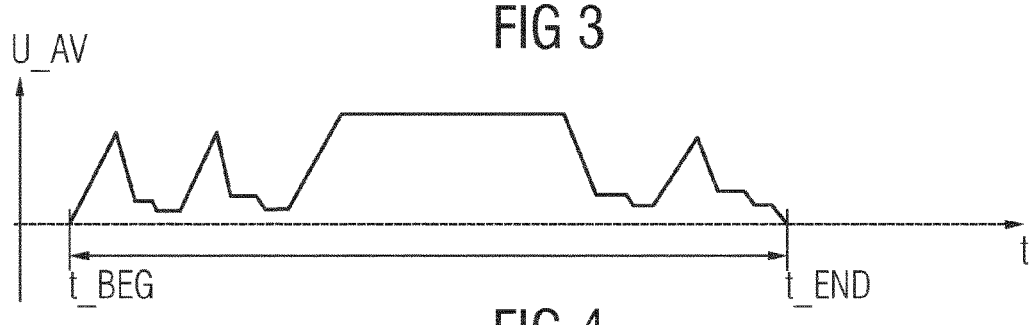
FIG. 4 shows further signal profiles during the operation of the injection valve.

The respective various operating modes are characterized in that a different combination of operating phases is present. FIGS. 3 and 4 illustrate signal profiles, to be precise idealized signal profiles, of an acquired voltage U_AV which drops at the solid-state actuator 18. In a first operating phase BP1, the solid-state actuator 18 is discharged to a predefined partial charge. In a second operating phase BP2, the solid-state actuator 18 is operated as a sensor. The operating period of the second operating phase BP2 is predefined, in particular, in such a way that the closed position of the nozzle needle is reached during the operating period.

A third operating phase BP3 is carried out while the solid-state actuator 18 is discharged further to a predefined reference state, to be precise by absorbing the energy in a discharge resistor. In particular, the solid-state actuator 18 is discharged in the third operating phase BP3 to a predefined reference charge which corresponds, for example, to a solid-state actuator which is completely or virtually completely discharged, and therefore results in a voltage drop at the solid-state actuator 18 of, for example, 0 V. However, owing to the properties of the solid-state actuator 18 it is possible for the reference charge to assume a value which deviates from a neutral value.

The partial charge is predefined, for example, in such a way that up to approximately 20 V of voltage drops at the solid-state actuator 18. The operating phase BP2 can be predefined, for example, at approximately 80 μs, and the operating phase BP3 is predefined, for example, at approximately 100 μs.

While the discharge process is being carried out in the first and also in the second operating phases BP1, BP2, the charge which is conducted away is preferably buffered in a capacitor in order to be able to feed it again to the solid-state actuator 18 in the case of a renewed charging process.

In a first operating mode, both the first operating phase BP1 and the second operating phase BP2 as well as the third operating phase BP3 are present. What is referred to as a main injection is frequently carried out in the first operating mode.

In contrast to the first operating mode, in a second operating mode the first operating phase BP1 and subsequently the second operating phase BP2 are carried out, while the third operating phase BP3 is omitted. In this way, the minimum possible metering interval between two successive metering operations of fluid is reduced compared to the first operating mode BM1. In the second operating mode BM2 there is still a small residual charge in the solid-state actuator 18. In particular the electrohydraulic delay time period is also shortened by the residual charge.

In the signal profile illustrated in FIG. 4, the injection valve is operated in the second operating mode BM2, for example, during the first two partial injections illustrated there and the subsequent main injection, while it is operated in the first operating mode BM1 in the last partial injection, which can also be referred to as a post-injection.

In a third operating mode, the first operating phase BP1 is carried out, while the second and third operating phases BP2, BP3 are omitted. In this way, the minimum metering interval is reduced further. In the third operating mode, the second operating phase BP2 is also omitted, and therefore operation of the solid-state actuator 18 as a sensor with corresponding detection of the impacting of the nozzle needle 12 at its closed position is also dispensed with.

In this context, in the first operating phase BP1 in the third operating mode it is also possible to discharge the solid-state actuator 18 to a partial charge which is increased compared to the second and/or third operating modes. This also contributes to further shortening of the electrohydraulic delay time period.

A hardware integrator circuit arrangement (see FIG. 3) is preferably embodied in the control device. It is designed, in particular, to detect a current through the solid-state actuator 18, to be precise by means of a shunt resistor R_S and a difference amplifier 26. The output signal of the difference amplifier 26 is fed to an integrator 28 which can be reset to a neutral value, for example zero, by means of a resetting signal RES.

The output signal of the integrator 28 is fed to an A/D converter 30 which is designed to perform analog/digital conversion of the input signal that is present there.

The output signal of the A/D converter 30 represents values KG_W of a characteristic variable for a state of charge of the solid-state actuator 18. The conversion in the A/D converter 30 takes place with a predefined sampling rate. The values KG_W of the characteristic variable for the state of charge of the solid-state actuator 18 are fed to a signal processing unit 32. The latter comprises an offset compensation unit 34 which is designed to determine a correction offset signal as a function of the values KG_W of the characteristic variable and to feed them to a D/A converter 36, which then generates a correspondingly analog correction offset signal I_OFFS_KOR which is fed to the difference amplifier 26 for offset compensation. The correction offset signal I_OFFS_KOR is respectively newly determined chronologically correlated with the third operating phase BP3, to be precise preferably toward the end thereof, and then acts on the output signal of the difference amplifier 26 for a subsequent injection process. The quality of the analog correction offset signal I_OFFS_KOR depends greatly on the accuracy of the D/A converter 36.

The resetting signal RES is generated, in particular, chronologically correlated with a start of a respective injection process, to be precise in particular at the start of the injection process. The start of the injection process does not necessarily define the start of the metering of fluid, but instead a chronological correlation with the start of the actuation of the solid-state actuator 18 for feeding in charge for initiating the metering of fluid. The start of the injection process can therefore be the start of the actuation of the solid-state actuator 18 for feeding in charge for initiating the metering of fluid.

Figure 5:
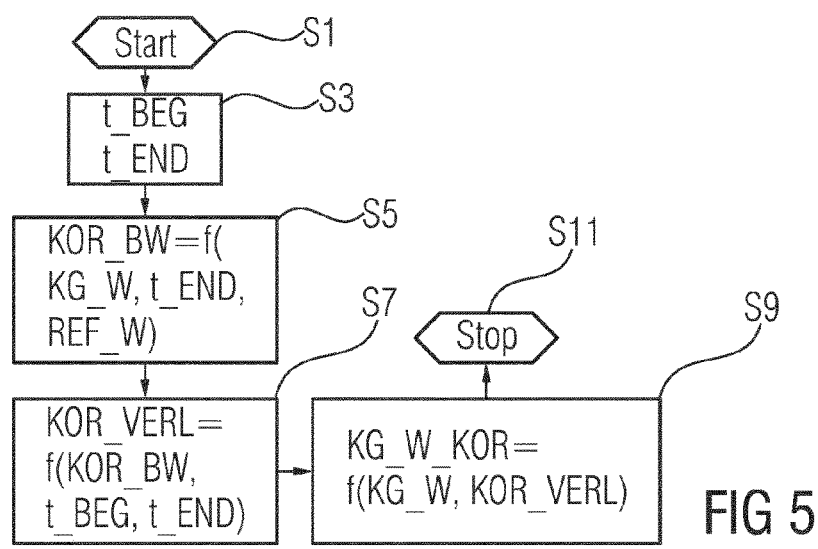
FIG. 5 shows a flowchart of a program.

A program for operating the injection valve is stored in a memory of the control device 22 and is processed during the operation of the injection valve in a computing unit of the control device which can comprise, for example, a microprocessor. The program (FIG. 5) is started in a step S1 in which, if appropriate, variables are initiated.

In a step S3, a starting reference time t_BEG is determined for a respective current injection process. The starting reference time t_BEG corresponds, for example, approximately or, in particular, precisely to the start of the actuation of the injection valve in the case of the starting of the respective injection process. Corresponding examples of this are illustrated in the signal profiles of FIGS. 3 and 4.

In addition, a final reference time t_END is determined chronologically correlated with the third operating phase BP3, to be precise in particular assigned to that time at which the respective discharge process is currently completed in the third operating phase BP3. A time period between the respective starting reference time t_BEG and the respective final reference time t_END therefore extends over the entire injection process, that is to say, for example, as illustrated in FIG. 3, over what is referred to as a main injection. In the case of the signal profiles according to FIG. 3, corresponding starting and reference times t_BEG, t_END for the pre-injection or post-injection illustrated there can also be determined.

The signal profile illustrated in FIG. 4 comprises linking of partial injections, and therefore the time period between the starting reference time t_BEG and the final reference time t_END comprises the entire time period of the partial injections, and the partial injections can be pre-injections or post-injections or also the main injection.

In a step S5, a correction reference value KOR_BW is determined, to be precise as a function of a value KG_W of the characteristic variable which was acquired correlated with the end of the third operating phase BP3. The said value KG_W is also acquired, in particular correlated or, in particular, also approximately in a way which coincides with the final reference time t_END.

Furthermore, the said value KG_W is preferably determined as a function of a reference value REF_W which represents a still remaining quantity of charge. The latter can, for example, be permanently predefined and can be determined, for example, by test or simulation and/can be determined dynamically by means of a charge observer. Said charge quantity basically has a very low value such as, for example, 65 μAs.

The correction reference value KOR_BW is determined, in particular, as a function of a difference between the value KG_W of the characteristic variable, which was acquired correlated with the end of the third operating phase BP3, and the reference value REF_W. Said correction reference value KOR_BW can correspond, for example, directly to this difference.

The correction reference value KOR_BW therefore represents a total offset which arises during a respective injection process.

In a step S7 a correction value profile KOR_VERL is determined as a function of the final reference time t_END, the starting reference time t_BEG and the correction reference value KOR_BW. In this context, a predefined function, such as, for example, a linear function or else a function which approximates to the correction reference value KOR_BW exponentially, is assigned to the correction value profile. In the case of the linear function, the gradient corresponds, for example, to the quotient of the correction reference value KOR_BW and the difference between the final reference time t_END and the starting reference time t_BEG.

In a step S9, the acquired values KG_W of the characteristic variable for the state of charge are then corrected as a function of the correction value profile KOR_VERL. This takes place in a corresponding chronological assignment of the respective values KG_W to their position in the respective injection process. Therefore, for example in the case of a linear function, in the case of the correction value profile KOR_VERL half the value of the correction reference value KOR_BW is added, for the purpose of correction, to a value KG_W which is precisely in the center of the time interval between the starting reference time t_BEG and the final reference time t_END.

The values KG_W_COR, corrected in this way, of the characteristic variable for the state of charge are then made available, in particular, to other programs which are stored in the control device 22, and are processed during the operation of the injection valve, in order to evaluate further said values KG_W_COR, to be precise, for example, with respect to the detection of specific characteristic points which may be, for example, representative of the impacting of the nozzle needle 12 in its closed position.

The program is subsequently ended in a step S11. The program is preferably called again for each injection process.

What is claimed is:

1. A method for operating an injection valve having a nozzle needle that moves between a closed position that prevents a metering of fluid and other positions that allow the metering of fluid, and a solid-state actuator that acts on the nozzle needle to influence its position, the method comprising using a controller to:
   acquire values of a characteristic variable for a state of charge of the solid-state actuator at a predefined sampling rate,
   determine a starting reference time and a final reference time that are chronologically correlated with an operating phase in which the solid-state actuator is discharged to a predefined reference state by absorbing the energy in a discharge resistor,
   determine a correction reference value as a function of (a) a value of the characteristic variable for the state of charge of the solid-state actuator which is acquired is connection with an end of the operating phase and (b) a predefined reference value,
   determine a correction value profile as a function of the final reference time, the starting reference time, and the correction reference value,
   correct the acquired values of the characteristic variable for the state of charge as a function of the correction value profile, and
   actuate the injection valve for at least one injection cycle using corrected values of the characteristic variable.

2. The method of claim 1, wherein the correction value profile is linear.

3. The method of claim 2, wherein the linear correction value profile has a gradient that corresponds to the quotient of the correction reference value and a difference between the final reference time and the starting reference time.

4. The method of claim 1, wherein the starting reference time corresponds to a start of an actuation of the injection valve for the respective injection process.

5. The method of claim 1, wherein a time period between the starting reference time and the final reference time over the entire injection process, which includes a main injection.

6. The method of claim 1, wherein the value of the characteristic variable from which value the correction reference value is determined correlates with the final reference time.

7. The method of claim 1, wherein the correction value profile corresponds exponentially to the correction reference value.

8. The method of claim 1, wherein correcting the acquired values of the characteristic variable for the state of charge as a function of the correction value profile comprises chronologically assigning each of the acquired values of the characteristic variable to a respective position in the injection process.

9. A controller for operating an injection valve having a nozzle needle that moves between a closed position that prevents a metering of fluid and other positions that allow the metering of fluid, and a solid-state actuator that acts on the nozzle needle to influence its position, wherein the controller is programmed to:
   acquire values of a characteristic variable for a state of charge of the solid-state actuator with a predefined sampling rate,
   determine a starting reference time and a final reference time that are chronologically correlated with an operating phase in which the solid-state actuator is discharged to a predefined reference state by taking up the energy in a discharge resistor,
   determine a correction reference value as a function of (a) a value of the characteristic variable for the state of charge of the solid-state actuator which is determined in connection with an end of the operating phase, and (b) a predefined reference value,
   determine a correction value profile as a function of the final reference time, the starting reference time and the correction reference value,
   correct the acquired values of the characteristic variable for the state of charge as a function of the correction value profile, and
   actuate the injection valve for at least one injection cycle using corrected values of the characteristic variable.

10. The device of claim 9, wherein the correction value profile is linear.

11. The device of claim 10, wherein the linear correction value profile has a gradient that corresponds to the quotient of the correction reference value and a difference between the final reference time and the starting reference time.

12. The device of claim 9, wherein the starting reference time corresponds to a start of an actuation of the injection valve for the respective injection process.

13. The device of claim 9, wherein a time period between the starting reference time and the final reference time over the entire injection process, which includes a main injection.

14. The device of claim 9, wherein the value of the characteristic variable from which value the correction reference value is determined correlates with the final reference time.

15. The device of claim 9, wherein the correction value profile corresponds exponentially to the correction reference value.

16. The device of claim 9, wherein correcting the acquired values of the characteristic variable for the state of charge as a function of the correction value profile comprises chronologically assigning each of the acquired values of the characteristic variable to a respective position in the injection process.

* * * * *